United States Patent
Midya et al.

(10) Patent No.: US 8,638,836 B2
(45) Date of Patent: Jan. 28, 2014

(54) TRANSMITTER SIGNAL INJECTION COMPENSATION

(75) Inventors: Pallab Midya, Palatine, IL (US); Rakers L Patrick, Kildeer, IL (US); William J Roeckner, Carpentersville, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 1154 days.

(21) Appl. No.: 12/551,495

(22) Filed: Aug. 31, 2009

(65) Prior Publication Data

US 2011/0051833 A1   Mar. 3, 2011

(51) Int. Cl.
*H04B 1/38* (2006.01)

(52) U.S. Cl.
USPC ........... 375/219; 370/286; 370/288; 370/290; 327/551; 379/406.01; 379/406.05; 455/78; 455/570

(58) Field of Classification Search
None
See application file for complete search history.

(56) References Cited

U.S. PATENT DOCUMENTS

| | | | |
|---|---|---|---|
| 3,757,235 A * | 9/1973 | McCormick et al. | 327/551 |
| 4,742,510 A * | 5/1988 | Quatieri et al. | 370/290 |
| 5,953,640 A | 9/1999 | Meador et al. | |
| 7,349,673 B2 | 3/2008 | Moloudi et al. | |
| 2006/0091950 A1 * | 5/2006 | Hayase | 330/149 |
| 2010/0048146 A1 * | 2/2010 | McCallister | 455/78 |

OTHER PUBLICATIONS

"An integrated LMS Adaptive Filter of TX Leakage for CDMA Receiver Front Ends", V. Aparin, G. J. Ballantyne and C. J. Persico, IEEE Journal of Solid State Circuits, vol. 41, No. 5, May 2006.
"Integrated Blocker Filtering RF Front Ends", A. Safarian, A. Shameli, A. Rofougaran, M. Rofougaran and F. D. Flaviis, IEEE Radio Frequency Integrated Circuits Symposium, 2007.

* cited by examiner

*Primary Examiner* — Adolf Dsouza

(74) *Attorney, Agent, or Firm* — Patents and Licensing LLC; Daniel W Jeffernbruch

(57) ABSTRACT

A transceiver mitigates signal leakage into a receive path from a transmit path. A subtraction circuit determines a difference between a receive signal and a compensation signal to produce a compensated receive signal prior to demodulation by a demodulator. An equalizer both amplitude adjusts and phase adjusts orthogonal baseband transmit signals based on the difference from the subtraction circuit to produce the compensation signal. A digital tuning circuit determines at least one amplitude adjust coefficient to be used by the equalizer. The equalizer can have a polarity switch or a variable attenuator or a variable delay.

20 Claims, 5 Drawing Sheets

TRANSMITTER SIGNAL INJECTION COMPENSATION

BACKGROUND OF THE INVENTIONS

1. Technical Field

The present inventions relate to circuits for transceivers and, more particularly, relate to compensation of transmit leakage into a receiver.

2. Description of the Related Art

Duplexers are typically used to couple transmitters and receivers to a shared antenna. When both a transmitter and a receiver operate simultaneously they allow full duplex operation. Typically in full duplex operation the transmitter and receiver operate in frequency bands that are different from one another. In a transceiver, however, even when the transmitter and the receiver operate in different frequency bands, leakage will bleed from the transmitter to the receiver. This occurs both within the duplexer itself and between components of the transmitter and the receiver.

Typically a receive signal is the weakest and the transmit signal is the strongest. The transmitted signal can be 90 dB higher than the received signal. A duplexer can have less than 50 dB suppression of the transmitted signal. The transmitted signal is the largest signal in the receiver. The receiver then has to extract the desired receive signal in the presence of this much larger transmit signal. Transmitter signal leakage into a receiver thus causes reduction in sensitivity of the receiver. Besides reducing transmit leakage into a receiver, it is desired to also improve sensitivity of the receiver.

Prior techniques for mitigating transmit leakage into a receiver used an additional receiver to cancel the transmit signal in the receive path. Two papers describing prior techniques for mitigating transmit leakage into a receiver were: "An integrated LMS Adaptive Filter of TX Leakage for CDMA Receiver Front Ends", V. Aparin, G. J. Ballantyne and C. J. Persico, IEEE Journal of Solid State Circuits, Vol. 41, No. 5, May 2006 and "Integrated Blocker Filtering RF Front Ends", A. Safarian, A. Shameli, A. Rofougaran, M. Rofougaran and F. D. Flaviis, IEEE Radio Frequency Integrated Circuits Symposium, 2007.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Embodiments as described herein reduce transmit leakage into a receiver by adding a transmit signal into the receive path to cancel out the leakage. The transmit signal added into the receive path is a compensating signal derived from the transmit path using an equalizer.

Merely subtracting the transmit value from the receive path is not good enough to cancel because the transmit path adds propagation delay and attenuation. Thus the phase and amplitude of the correction signal is considered for accuracy. The embodiments as described herein create an attenuated version of the transmitted signal with both amplitude and phase control. This can be injected into a receive path. The amplitude and phase of the injected signal can be tuned individually to minimize the amplitude or power of out of band signals of the received signal after it has been mixed down to baseband.

Figure 1:
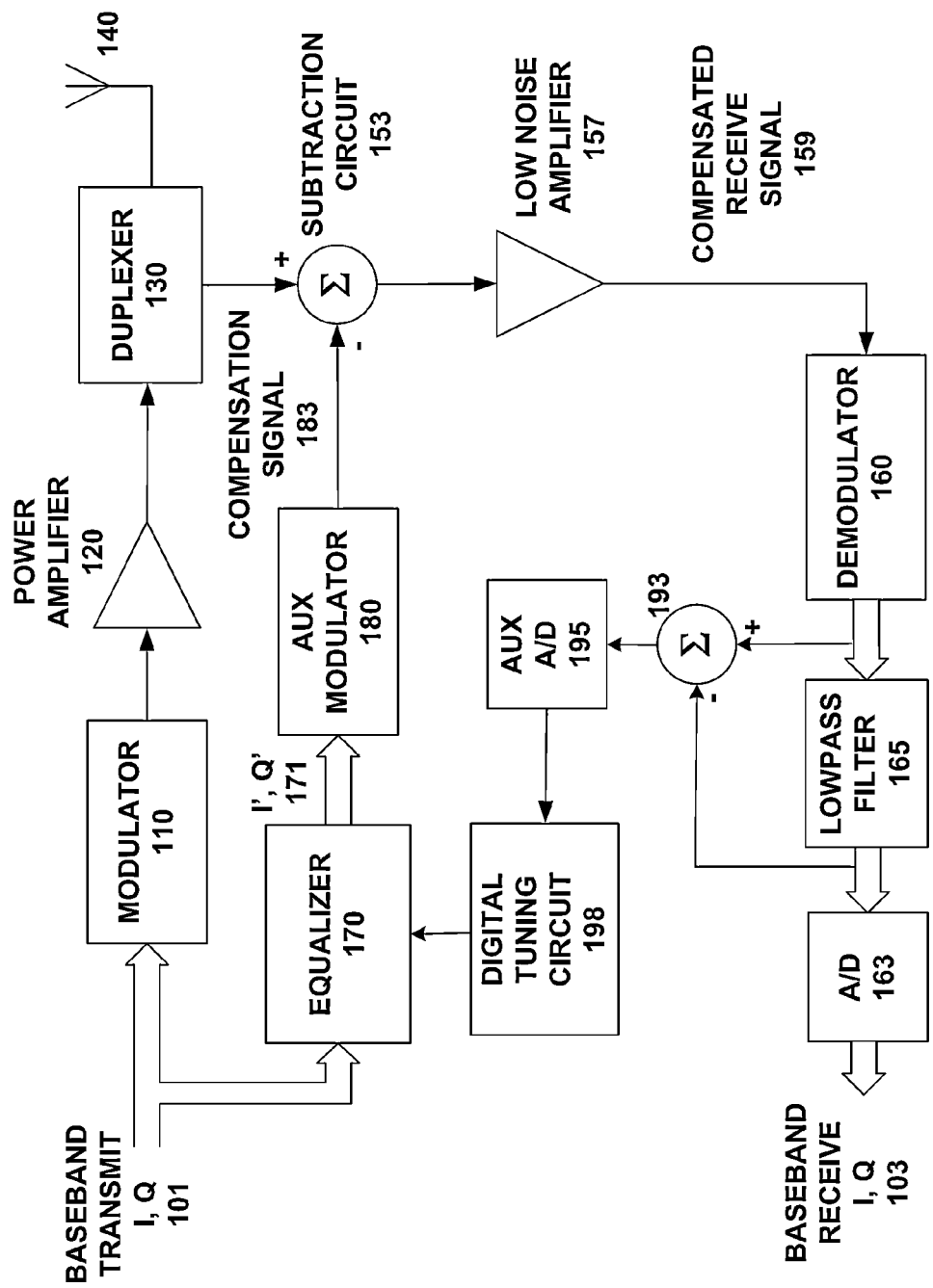
FIG. 1 illustrates a schematic block diagram of a transceiver with transmit and receive paths capable of mitigating transmit signal leakage into receive components according to an exemplary embodiment of the present inventions.

FIG. 1 illustrates a schematic block diagram of a transceiver with transmit and receive paths capable of mitigating transmit signal leakage into receive components. The transceiver has transmit and receive paths. The transceiver mitigates signal leakage into receive components of the receive path from transmit components of the transmit path.

In the transmit path a modulator 110 modulates orthogonal baseband transmit signals 101 to produce modulated transmit signals. Orthogonal signals are ninety degrees out of phase from one another and can be the quadrature I and Q signals as illustrated in FIG. 1. A power amplifier 120 amplifies the modulated transmit signals to produce amplified modulated transmit signals and a duplexer 130 passes the amplified modulated transmit signals to an antenna 140.

In the receive path the duplexer 130 passes receive signals from the antenna to a demodulator 160, with a receive low noise amplifier 157 and a subtraction circuit 153 coupled therebetween.

The subtraction circuit 153 determines a difference between the receive signal and a compensation signal 183 to produce a compensated receive signal 159 prior to demodulation by the demodulator 160. The subtraction by the subtraction circuit 153 reduces the transmit energy in the receive path. An equalizer 170 both amplitude adjusts and phase adjusts the orthogonal baseband transmit signals 101 based on the difference 159 from the subtraction circuit to produce the compensation signal. An auxiliary modulator 180 between the equalizer and the subtraction circuit modulates the compensation signal 183. The output I', Q' 171 of the equalizer 170 is preferably modulated by the auxiliary modulator 180 before becoming the compensation signal 183 however the output of the equalizer 170 itself can be the compensation signal.

The subtraction circuit 153 has a differential function and can also have a low noise amplifier integral within. Alternately, the subtraction circuit 153 can have no amplification and a low noise amplifier 157 placed between subtraction circuit 153 and the duplexer 130. A further alternate would be to use the low noise amplifier 157 after the subtraction circuit 153 as illustrated in the one exemplary embodiment of FIG. 1. Thus although the low noise amplifier 157 in the one exemplary embodiment of FIG. 1 is illustrated after the subtraction circuit 153, in an alternate embodiment the low noise amplifier 157 can be located before the subtraction circuit 153. Additionally, in some transceiver chip implementations, a conductive path has been laid between the transmit circuitry and the receive circuitry for purposes of RF calibration of the receive circuitry. One embodiment of the present inventions could re-use this conductive path to deliver the compensation signal 183 to the subtraction circuit 153 from the auxiliary modulator 180.

The demodulated receive signal output of the demodulator 160 is low pass filtered by a low pass filter 165 and converted from analog to digital in the analog to digital converter 163 to produce the orthogonal baseband receive signals 103. A subtractor 193 determines a difference between the demodulated signal and the low pass filtered demodulated signal. An auxiliary analog to digital converter provides the input to the digital tuning circuit 198. This provides an image of the compensated signal for determining the variables to the equalizer by the digital tuning circuit 198.

The digital tuning circuit 198 has an input signal representative of the transmit signal energy in the receive path. The digital tuning circuit 198 provides inputs to the equalizer 170, such as amplitude and phase adjustments, in order to minimize the transmit energy in the receive path. More about the digital tuning circuit 198 and the equalizer 170 will be described below by equations 4 or equation 5 and with reference to FIGS. 2 and 3.

Detailed examples of the digital tuning circuit 198 and the equalizer 170 will be discussed with reference to FIGS. 2 and 3.

Figure 2:
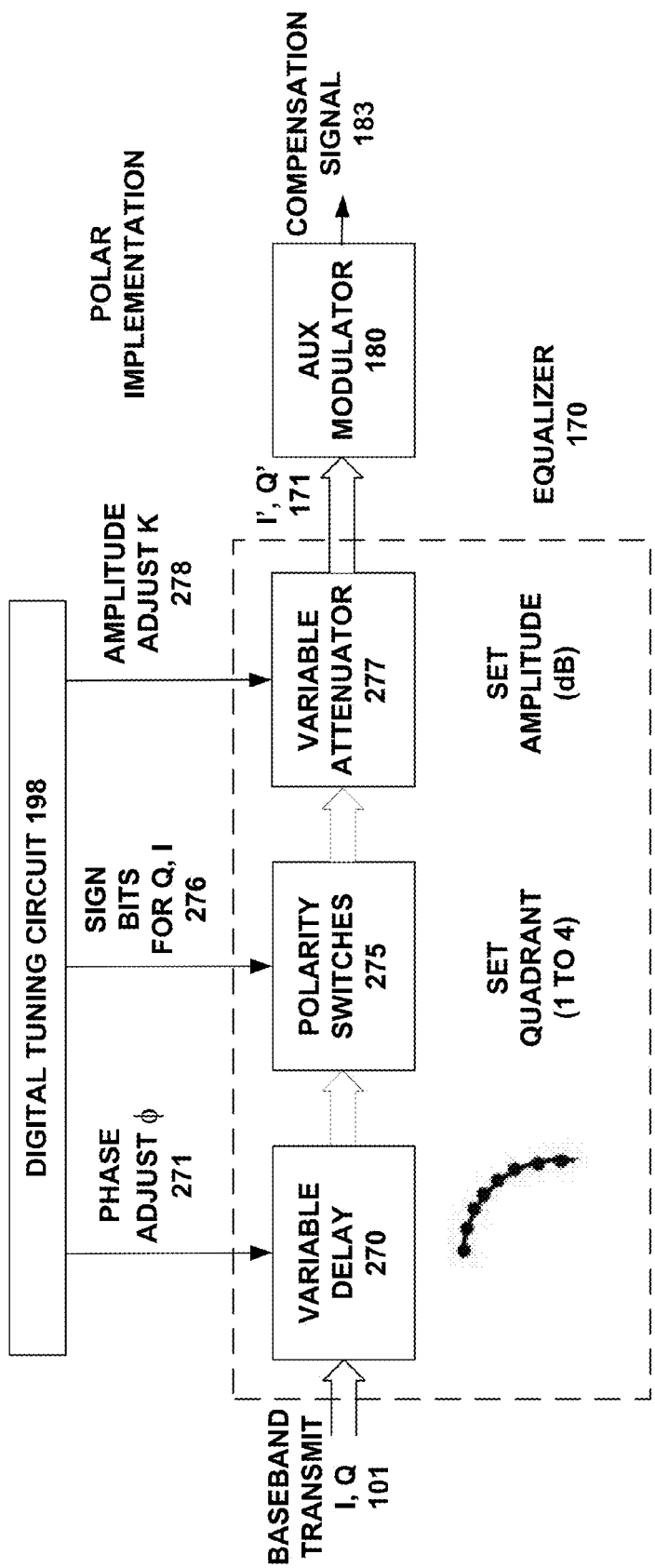
FIG. 2 illustrates a schematic block diagram of compensation circuitry capable of mitigating transmit signal leakage into receive components according to one exemplary polar implementation embodiment of the present inventions.

FIG. 2 illustrates a schematic block diagram of compensation circuitry capable of mitigating transmit signal leakage into receive components according to one exemplary polar implementation embodiment. A digital tuning circuit 198 determines at least one amplitude adjust coefficient 278 to be used by the equalizer 170 for the amplitude adjust and the phase adjust of the orthogonal baseband transmit signals based on the difference 159 from the subtraction circuit 153. The digital tuning circuit determines at least one amplitude adjust coefficient 278 and at least one phase adjust coefficient 271 to be used in polar implementation by the equalizer for the amplitude adjust and the phase adjust of the orthogonal baseband transmit signals based on the difference from the subtraction circuit. The equalizer uses a variable attenuator 277 to adjust the amplitude of the orthogonal baseband transmit signals 101 and can have a variable delay 270 to adjust the phase of the orthogonal baseband transmit signals.

Figure 3:
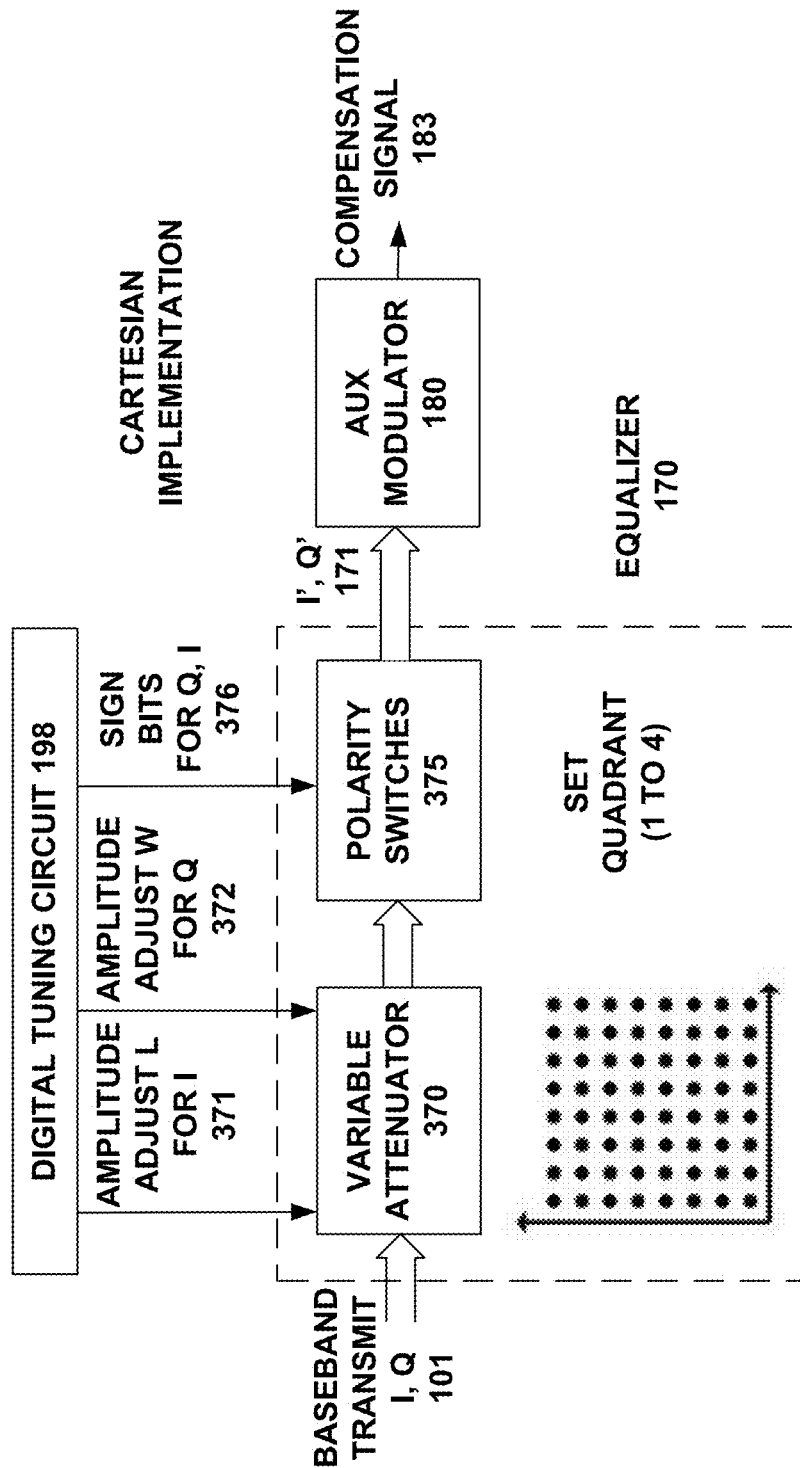
FIG. 3 illustrates a schematic block diagram of compensation circuitry capable of mitigating transmit signal leakage into receive components according to one exemplary Cartesian implementation embodiment of the present inventions.

FIG. 3 illustrates a schematic block diagram of compensation circuitry capable of mitigating transmit signal leakage into receive components according to one exemplary Cartesian implementation embodiment. A digital tuning circuit 198 determines at least one amplitude adjust coefficient 371, 372 to be used by the equalizer 170 for the amplitude adjust and the phase adjust of the orthogonal baseband transmit signals based on the difference 159 from the subtraction circuit 153. The digital tuning circuit 198 determines at least two amplitude adjust variables 371, 372 to be used in a Cartesian implementation by the equalizer for the amplitude adjust and the phase adjust of the orthogonal baseband transmit signals based on the difference from the subtraction circuit. The equalizer uses a variable attenuator 370 to adjust both the amplitude and the phase of the orthogonal baseband transmit signals 101.

The embodiments as described herein can permit the sizes of the analog to digital converters to be reduced because there is less risk of saturating the input stage. This innovation reduces the linearity and performance requirements for the receiver lineup and thus saves power and results in higher overall performance.

The equalizer 170 can be constructed with a polarity switch 275, 375 to simplify construction by reducing the degree of attenuation necessary. The polarity switch 275, 375 is used to adjust the polarity of both the I and Q components to select at least one quadrant in which to adjust both the amplitude and the phase of the orthogonal baseband transmit signals 101. Digital tuning circuit 198 provides sign bits for Q, I 276, 376 for controlling the polarity switches 275, 375. The polarity switches 275, 375 set the sign of I' and Q' according to the state of sign bits for Q, I 276, 376. One embodiment of polarity switches 275, 375 consists of simply multiplying the I, Q signals by either +1 or −1 according to the state of sign bits for Q, I 276, 376. By applying a polarity switch 275, 375, the desired degree of attenuation can still be achieved with a variable attenuation 277, 370 of smaller attenuation as will be described with reference to Table A.

TABLE A

| Implementation | Number of adjustment bits | Number of quadrant bits | Maximum reduction of transmit level in receive path |
|---|---|---|---|
| Cartesian | 4 for I and 4 for Q | 2 | approx. 30 dB. |
| Cartesian | 6 for I and 6 for Q | 2 | approx. 42 dB |
| Polar | 4 for phase and 4 for amplitude | 2 | approx. 15 dB |
| Polar | 6 for phase and 6 for amplitude | 2 | approx. 26 dB |

As can be seen from Table A, less adjustment bits are needed with two quadrant bits. Depending on the application, a polarity switch might even be used as the variable attenuator without additional adjustment bits if the desired reduction can be obtained.

Reducing the transmitter signal leakage by even 10 dB greatly reduces the power consumption of the low noise amplifier 157, demodulator 160 and analog-to-digital converter 163. Besides reducing transmit leakage into a receiver, the present inventions can improve sensitivity of the receiver. The linearity and dynamic range requirements of the receive path all the way up to the ADC are partly determined by the leaked transmit signal. Reducing the transmit signal level in the receiver by 10 dB or 20 dB greatly reduces the performance requirement of this critical receiver circuit. The power consumption, size and cost of the transceiver is reduced as the transmit signal in the receiver is reduced.

Figure 5:
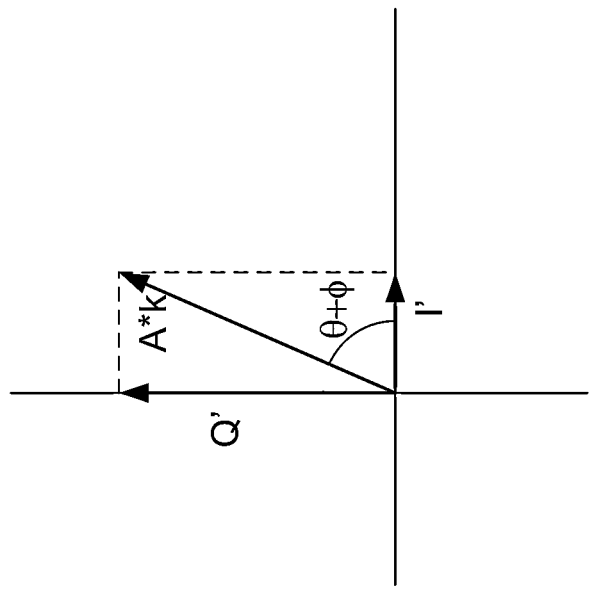
FIGS. 4 and 5 illustrate a graph of orthogonal signals according to one embodiment of the present inventions.
Figure 4:
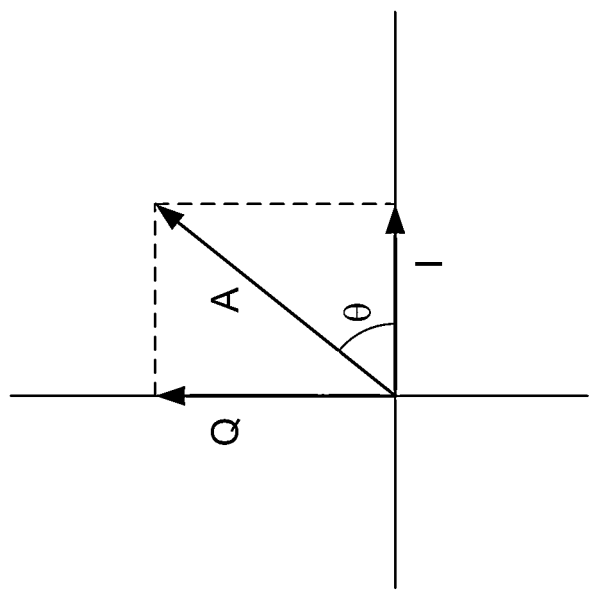

FIGS. 4 and 5 illustrate a graph of orthogonal signals according to one embodiment. The orthogonal signals are ninety degrees out of phase from one another as illustrated. They can be the quadrature signals I and Q illustrated in FIGS. 4 and 5. As illustrated in FIG. 4, taken together, the quadrature signals I and Q have an amplitude A with a phase $\theta$.

FIG. 5 illustrates the quadrature signals I and Q after modification by an equalizer. As illustrated in FIG. 5, taken together, the quadrature signals I and Q are amplitude adjusted by a constant k and/or phase adjusted by a factor $\phi$ to produce the quadrature signals I' and Q'.

I and Q vector components for a given phase angle are illustrated in FIG. 4.

$I = A \cos \theta$ $Q = A \sin \theta$ (equation 1)

For the case where the phase changes by an arbitrary amount, φ, the vector components are illustrated in the FIG. 5.

The new I' and Q' values can be expressed in terms of the original I and Q as follows:

$$I' = A\cos(\theta+\phi)$$

$$I' = A\cos\theta\cos\phi - A\sin\theta\sin\phi$$

$$I' = I\cos\phi - Q\sin\phi \quad \text{(equation 2)}$$

$$Q' = A\sin(\theta+\phi)$$

$$Q' = A\sin\theta\cos\phi + A\cos\theta\sin\phi$$

$$Q' = Q\cos\phi + I\sin\phi \quad \text{(equation 3)}$$

An amplitude change is made by simply multiplying (scaling) each I and Q component by a constant, k. Therefore, the equalizer 170 receives the original I and Q transmit components and adjusts the amplitude by a factor k and adjusts the phase by a factor φ to produce a resulting I' and Q' components according to the following equations:

$$I' = k \cdot (I\cos\phi - Q\sin\phi)$$

$$Q' = k \cdot (Q\cos\phi - I\sin\phi) \quad \text{(equation 4)}$$

wherein:
φ=the phase adjust bits 271 in FIG. 2
k=the amplitude bits 278 in FIG. 2
I=the orthogonal baseband transmit signals 101 in FIG. 2
Q=the orthogonal baseband transmit signals 101 in FIG. 2
I'=the orthogonal baseband transmit signals 171 in FIG. 2
Q'=the orthogonal baseband transmit signals 171 in FIG. 2

Note that this is independent of polar or Cartesian coordinates. For Cartesian coordinates it can be simply expressed as:

$$I' = L \cdot I$$

$$Q' = W \cdot Q \quad \text{(equation 5)}$$

wherein:
L=the amplitude adjust bits 371 in FIG. 3
W=the amplitude bits 372 in FIG. 3
I=the orthogonal baseband transmit signals 101 in FIG. 3
Q=the orthogonal baseband transmit signals 101 in FIG. 3
I'=the orthogonal baseband transmit signals 171 in FIG. 3
Q'=the orthogonal baseband transmit signals 171 in FIG. 3

The Cartesian implementation of FIG. 3 relies on X and Y coordinates. The polar implementation is an alternative that requires a conversion to polar on input to FIG. 3. Example system implementations are second generation cellular telephone systems such as TDMA, GSM and CDMA and third generation cellular telephone systems. Polar is best for certain systems and Cartesian for other systems.

Figure 6:
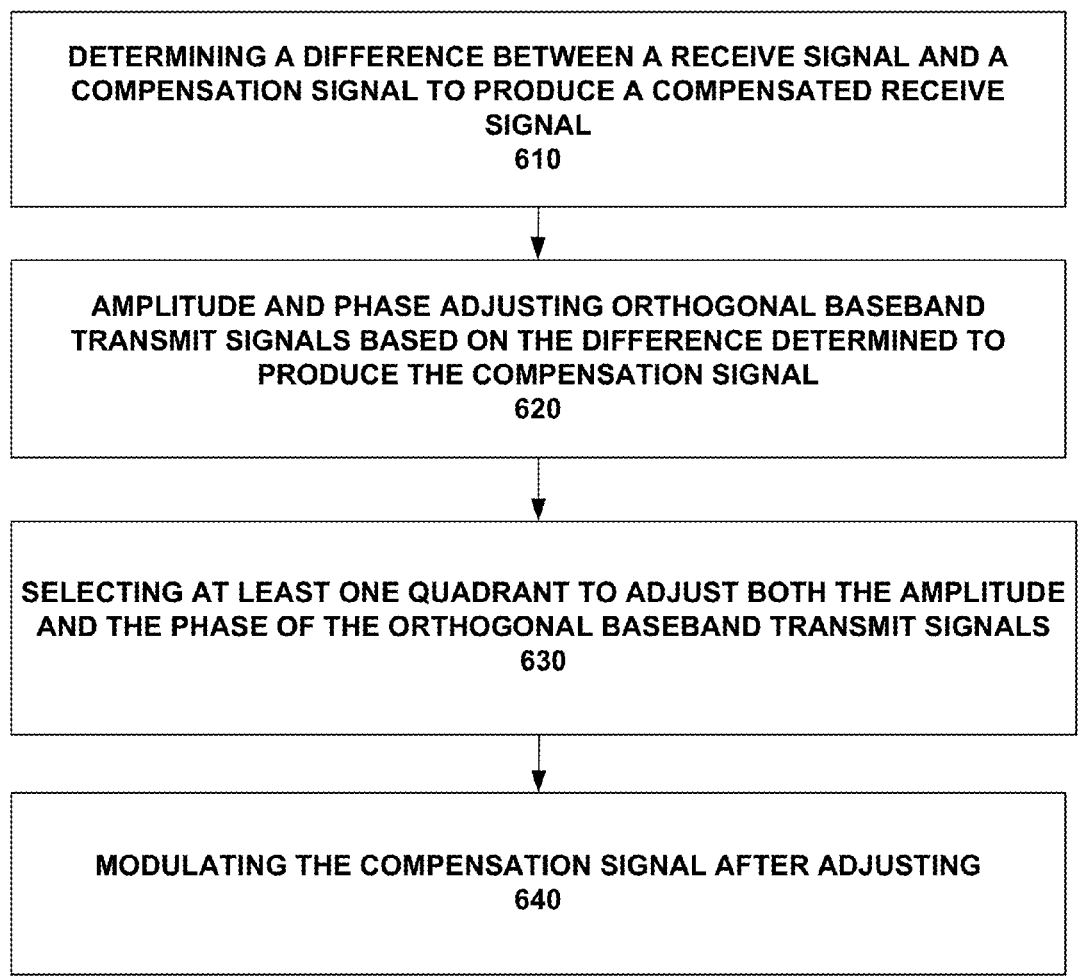
FIG. 6. illustrates a flow diagram for mitigating transmit path leakage into a receive path of a transmitter during simultaneous transmit and receive operation according to one embodiment of the present inventions.

FIG. 6. Illustrates a flow diagram for mitigating transmit path leakage into a receive path of a transmitter during simultaneous transmit and receive operation according to one embodiment of the present inventions. In step 610 a difference is determined between a receive signal and a compensation signal to produce a compensated receive signal. Although this difference can be taken by a subtraction circuit, it can also be determined in a processor. In step 620 the orthogonal baseband transmit signals are amplitude and phase adjusted based on the difference determined to produce the compensation signal. An equalizer can be used to amplitude and phase adjust the orthogonal baseband transmit signals. The equalizer would adjust based on the difference determined in step 610. In step 630 at least one quadrant can be selected to adjust both the amplitude and the phase of the orthogonal baseband transmit signals. A polarity switch can be used to select the at least one quadrant if such is implemented in an embodiment. Step 640 modulates the compensation signal after adjusting. This can be performed by an auxiliary modulator. Although a modulator is typically located in a transmit path, the auxiliary modulator is different in that it is located in a compensation portion of the receive path.

The signal processing techniques disclosed herein with reference to the accompanying drawings are preferably implemented on one or more digital signal processors (DSPs) or other microprocessors. Nevertheless, such techniques could instead be implemented wholly or partially as hard-wired circuits. Further, it is appreciated by those of skill in the art that certain well known digital processing techniques are mathematically equivalent to one another and can be represented in different ways depending on choice of implementation.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The receiver and the transmitter can have different circuit configurations than the examples illustrated in the drawings. Any benefits, advantages, or solutions to problems that are described herein with regard to specific embodiments are not intended to be construed as a critical, required, or essential feature or element of any or all the claims.

Any letters designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A circuit capable of mitigating transmit path leakage into a receive path during simultaneous transmit and receive operation of a transceiver, comprising:
    a first bandpass modulator for modulating a baseband orthogonal transmit signal to produce a RF modulated signal;
    a power amplifier operatively coupled to the first bandpass modulator to amplify the RF modulated signal and produce a RF amplified modulated signal;
    a duplexer operatively coupled to the power amplifier to pass the RF amplified modulated signal to an antenna and to pass a RF receive signal from the antenna;
    an equalizer for adjusting the baseband orthogonal transmit signal based on tuning feedback from a baseboard demodulated compensated receive signal and produce a baseband compensation signal;
    a second bandpass modulator operatively coupled to the equalizer to RF modulate the baseband compensation signal from the equalizer and produce a RF compensation signal;
    a RF subtraction circuit operatively coupled to the duplexer and the second bandpass modulator to determine a difference between a RF receive signal and the RF compensation signal and produce a RF compensated receive signal and;
a band pass demodulator operatively coupled to the subtraction circuit and the equalizer to demodulate the RF compensated receive signal and produce the baseband demodulated compensated receive signal for both feedback tuning the equalizer and for representing a received signal.

2. A circuit according to claim 1, wherein the equalizer comprises a polarity switch to select at least one quadrant in which to adjust both amplitude and phase of the baseband orthogonal transmit signal.

3. A circuit according to claim 1, wherein the equalizer comprises a variable attenuator to adjust both amplitude and phase of the baseband orthogonal transmit signal.

4. A circuit according to claim 1, wherein the equalizer comprises a variable attenuator to adjust amplitude and a variable delay to adjust the baseband orthogonal transmit signal.

5. A circuit according to claim 1, further comprising:
a digital tuning circuit operatively coupled to the equalizer and the RF subtraction circuit to determine at least one coefficient to be used to tune the equalizer for amplitude and phase adjust of the baseband orthogonal transmit signal based on the receive the RF compensated receive signal.

6. A circuit according to claim 5, wherein the digital tuning circuit determines at least two amplitude adjust variables to be used in a Cartesian implementation by the equalizer for the amplitude adjust and the phase adjust of the baseband orthogonal transmit signal based on the difference from the subtraction circuit.

7. A circuit according to claim 6, wherein the equalizer comprises a variable attenuator to adjust both the amplitude and the phase of the baseband orthogonal transmit signal.

8. A circuit according to claim 7, wherein the equalizer further comprises a polarity switch to select at least one quadrant in which to adjust both the amplitude and the phase of the baseband orthogonal transmit signal.

9. A circuit according to claim 5, wherein the digital tuning circuit determines at least one amplitude adjust coefficient and at least one phase adjust coefficient to be used in polar implementation by the equalizer for the amplitude adjust and the phase adjust of the baseband orthogonal transmit signal based on the difference from the subtraction circuit.

10. A circuit according to claim 9, wherein the equalizer comprises a variable attenuator to adjust the amplitude and a variable delay to adjust the phase of the baseband orthogonal transmit signal.

11. A circuit according to claim 10, wherein the equalizer further comprises a polarity switch to select at least one quadrant in which to adjust both the amplitude and the phase of the baseband orthogonal transmit signal.

12. A circuit according to claim 1, further comprising:
a receive low noise amplifier operatively coupled between the duplexer and the bandpass demodulator.

13. A circuit according to claim 1, further comprising:
a lowpass filter operatively coupled to the bandpass demodulator to pass filter the baseband demodulated compensated receive signal and produce an analog receive signal for representing the received signal; and
a baseband subtraction circuit operatively coupled to the lowpass filter to determine a difference between the baseband demodulated compensated receive signal and the analog receive signal and produce an image of the transmit signal for feedback tuning the equalizer.

14. A transceiver capable of mitigating signal leakage into receive components from transmit components, comprising:
a first bandbass modulator for modulating a baseband I and Q transmit signal to produce a RF modulated signal;
a power amplifier operatively coupled to the first bandpass modulator to amplify the RF modulated signal and produce a RF amplified modulated signal;
a duplexer operatively coupled to the power amplifier to pass the RF amplified modulated signal to an antenna and for passing an RF receive signal from the antenna;
an equalizer for adjusting the baseband I and Q transmit signal based on tuning feedback from a baseband demodulated compensated receive signal and produce a baseband compensation signal;
a second bandpass modulator operatively coupled to the equalizer to RF modulate the baseband compensation signal from equalizer and produce a RF compensation signal;
a RF subtraction circuit operatively coupled to the duplexer and the second bandpass modulator to determine a difference between the RF receive signal and the RF compensation signal and produce a RF compensated receive signal; and
a bandpass demodulator operatively coupled to the substraction circuit and the equalizer to demodulate the RF compensated receive signal and produce the baseband demodulated compensated receive signal for both feedback tuning the equalizer and for representing a received signal.

15. A circuit according to claim 14, further comprising:
a lowpass filter operatively coupled to the bandpass demodulator to pass filter the baseband demodulated compensated receive signal and produce an analog receive signal for representing the received signal; and
a baseband subtraction circuit operatively coupled to the lowpass filter to determine a difference between the baseband demodulated compensated receive signal and the analog receive signal and produce an image of the transmit signal for feedback tuning the equalizer.

16. A method of mitigating transmit path leakage into a receive path of a transmitter during simultaneous transmit and receive operation, said method comprising the steps of:
(a) bandpass modulating an orthogonal transmit signal to produce a RF modulated signal;
(b) amplifying the RF modulated signal and produce a RF amplified modulated signal;
(c) duplexing to pass the RF amplified modulated signal to an antenna and to pass a RF receive from the antenna;
(d) adjusting the baseband orthogonal transmit signal based on tuning feedback from a baseband demodulated compensated receive signal and produce a baseband compensation signal;
(e) bandpass modulating the baseband compensation signal from the equalizer and produce a RF compensation signal;
(f) subtracting the RF receive signal and the RF compensation signal to produce a RF compensated receive signal; and
(g) bandpass demodulating the RF compensated receive signal and produce the baseband demodulated compensated receive signal for both the feedback tuning in said step (d) and for representing a received signal.

17. A method according to claim 16, wherein said step (d) of adjusting the baseband orthogonal transmit signal comprises the substep of selecting at least one quadrant to adjust both amplitude and phase of the baseband orthogonal transmit signal.

18. A method according to claim 16, wherein said step (d) of adjusting the baseband orthogonal transmit signal comprises the substep of variably attenuating to adjust both amplitude and phase of the baseband orthogonal transmit signal.

19. A method according to claim 16, wherein said step (d) of adjusting the baseband orthogonal transmit signal comprises the substeps of variably attenuating to adjust amplitude and variably delaying to adjust phase of the baseband orthogonal transmit signal.

20. A method according to claim 16, further comprising the steps of:
 (h) lowpass filtering the baseband demodulated compensated receive signal to produce an analog receive signal for representing the received signal; and
 (i) subtracting the baseband demodulated compensated receive signal and the analog receive signal to produce an image of the transmit signal for the feedback tuning in said step (d).

* * * * *

UNITED STATES PATENT AND TRADEMARK OFFICE
CERTIFICATE OF CORRECTION

PATENT NO.      : 8,638,836 B2  
APPLICATION NO. : 12/551495  
DATED           : January 28, 2014  
INVENTOR(S)     : Pallab Midya et al.

Page 1 of 1

It is certified that error appears in the above-identified patent and that said Letters Patent is hereby corrected as shown below:

On the title page, item [75] 2${}^{nd}$ Inventor, "Rakers L. Patrick" should be changed to be
--Patrick L. Rakers--.

Signed and Sealed this
Twenty-eighth Day of April, 2015

Michelle K. Lee
*Director of the United States Patent and Trademark Office*